UNITED STATES PATENT OFFICE.

EUGENE C. SULLIVAN AND WILLIAM C. TAYLOR, OF CORNING, NEW YORK, ASSIGNORS TO CORNING GLASS WORKS, OF CORNING, NEW YORK, A CORPORATION OF NEW YORK.

GLASS.

1,151,911.  Specification of Letters Patent.  Patented Aug. 31, 1915.

No Drawing.  Application filed October 27, 1913. Serial No. 797,647.

*To all whom it may concern:*

Be it known that we, EUGENE C. SULLIVAN and WILLIAM C. TAYLOR, both citizens of the United States of America, and residents of Corning, New York, have invented certain new and useful Improvements in Glass, of which the following is a specification.

Our invention relates to a certain new and useful glass which is especially adapted for perfect union with metallic parts subjected to varying temperatures. Examples of such use are found in the seals between the glass parts of electric incandescent lamps and the leading-in wires thereof, and in enamel-insulating coatings for metallic electric conductors which are subjected to heating upon passage of current. As is well known the glasses or enamels for these purposes should have an expansion close to or the same as that of the base. The glass forming the subject of the application is one especially designed to form a seal with a base having a linear co-efficient of expansion varying between .000012 and .000017.

A glass for the purpose named, in addition to having a proper co-efficient of expansion must be soft and relatively stable, possess good vitrification, and must moreover for some of the above uses, remain viscid or pasty through a relatively wide range of temperature in order to permit its proper working and manipulation in the formation of the bulb or tubing, and the subsequent treatment thereof. By softness, we refer to the character of glass, when heated, of flowing, which property may be expressed by the temperature (as measured on the centigrade scale) at which a suspended thread of the glass heated through about half its length elongates of its own weight through a given distance (*i. e.* one millimeter) in a given time (*i. e.* one minute). Stability has reference to the resistance of glass to chemical attack, while vitrification has reference to the behavior of the glass when worked in a flame or from the melting pot.

We have found that a glass prepared by the following formula has, to a high degree, the desirable properties above named, the proportions stated being analytic *i. e.* those of the glass itself. Thus stated, our invention is embodied in its most perfect form in a glass having the following composition:—

| | |
|---|---|
| $SiO_2$ | 42 per cent. |
| $Na_2O$ | 19 " |
| $K_2O$ | 5 " |
| $BaO$ | 19 " |
| $Al_2O_3$ | 15 " |
| | 100 |

A glass formed from the above composition has a linear co-efficient of expansion as measured in the above terms of .0000135 and a hardness of 630° C.

A less perfect glass has the following composition;—

| | |
|---|---|
| $SiO_2$ | 60.50 per cent. |
| $Na_2O$ | 15.00 " |
| $BaO$ | 21.00 " |
| $Al_2O_3$ | 3.50 " |
| | 100.00 |

This glass, however, is harder than that given in the first named formula, it being 636° C., and its expansion co-efficient is .000011.

We have discovered that, generally speaking, the substitution of one per cent. of $Al_2O_3$ for two per cent. of $SiO_2$, while raising the expansion of co-efficient of the glass, does not effect the hardness and leaves that unchanged. Hence, the application of this rule to either of the above glass mixtures permits a variation in the expansion co-efficient through a relatively wide range while maintaining the hardness of the glass practically constant.

Having thus described our invention what we claim and desire to secure by Letters Patent is:—

1. A glass for the purpose stated having a linear expansion of more than .000012, and a hardness of less than 640° and containing barium oxid and alumina.

2. A glass containing barium and alkali oxids, and containing silica ranging from forty-two to sixty and one-half per cent.; and alumina ranging from fifteen to three and one-half per cent., the alumina and silica being interchangeable for each other in the proportions stated.

3. A glass comprising about forty-two per cent. silica, about nineteen per cent. barium oxid, and about fifteen per cent. alumina, and alkali.

4. A glass comprising about forty-two per cent. silica, about nineteen per cent. soda, about five per cent. potash, about nineteen per cent. barium oxid, and about fifteen per cent. alumina.

In testimony whereof we have hereunto signed our names in the presence of two witnesses.

EUGENE C. SULLIVAN.
WM. C. TAYLOR.

Witnesses:
FRED. C. CAMERON,
G. WILLIS DRAKE.